United States Patent [19]

Yamaguchi et al.

[11] Patent Number: 4,777,535
[45] Date of Patent: Oct. 11, 1988

[54] APPARATUS FOR RECORDING CT IMAGES DIRECTLY ON A RECORDING MEDIUM WITHOUT USING A CRT

[75] Inventors: Keiki Yamaguchi; Masahiko Hasumi; Shozo Tomita; Edward L. Gow, all of Tokyo, Japan

[73] Assignee: Yokogawa Medical Systems, Limited, Tokyo, Japan

[21] Appl. No.: 74,538
[22] PCT Filed: Oct. 30, 1986
[86] PCT No.: PCT/JP86/00557
§ 371 Date: Jun. 23, 1987
§ 102(e) Date: Jun. 23, 1987
[87] PCT Pub. No.: WO87/02850
PCT Pub. Date: May 7, 1987

[30] Foreign Application Priority Data

Oct. 31, 1985 [JP] Japan .................................. 60-244826

[51] Int. Cl.⁴ .......................................... H04N 1/21
[52] U.S. Cl. .......................................... 358/296; 358/241
[58] Field of Search ............... 358/240, 241, 293, 296, 358/302; 346/107 R, 108

[56] References Cited

U.S. PATENT DOCUMENTS 3,988,742 10/1976 Meier et al. ........................ 358/302
4,004,079 1/1977 Boston .............................. 358/302
4,074,318 2/1978 Kapes, Jr. .......................... 358/230
4,445,128 4/1984 Dolan et al. .................... 346/107 R
4,455,578 6/1984 Fearnside ......................... 358/302

FOREIGN PATENT DOCUMENTS 59-127467 7/1984 Japan .
60-175065 9/1985 Japan .

Primary Examiner—Clifford C. Shaw
Attorney, Agent, or Firm—Moonray Kojima

[57] ABSTRACT

A medical image recording apparatus according to the present invention in which the optical path length of the optical system is extremely short and the number of mechanical operating mechanisms is reduced electronically scans an LED array assembly (14) having a plurality of one-dimensionally arranged LED's with an LED array controller (28) and feeds a photosensitive recording medium (15) in a direction perpendicular to the direction of arrangement of the LED's by means of a motor (17) controlled by a film feed controller (29). The LED array controller and the film feed controller are operated on the basis of commands given from a scanning controller (27) which is controlled by a CPU. The quantity of light emitted from each individual LED in the LED array assembly is controlled in accordance with a signal given to the LED array controller, the signal being formed in such a manner that image data which is stored in an image data storing memory (22) through an input interface (21) is formatted by means of an image formatter (25) and then converted into an analog signal by means of a D/A converter (26) or a pulse-width modulation circuit (30).

7 Claims, 2 Drawing Sheets

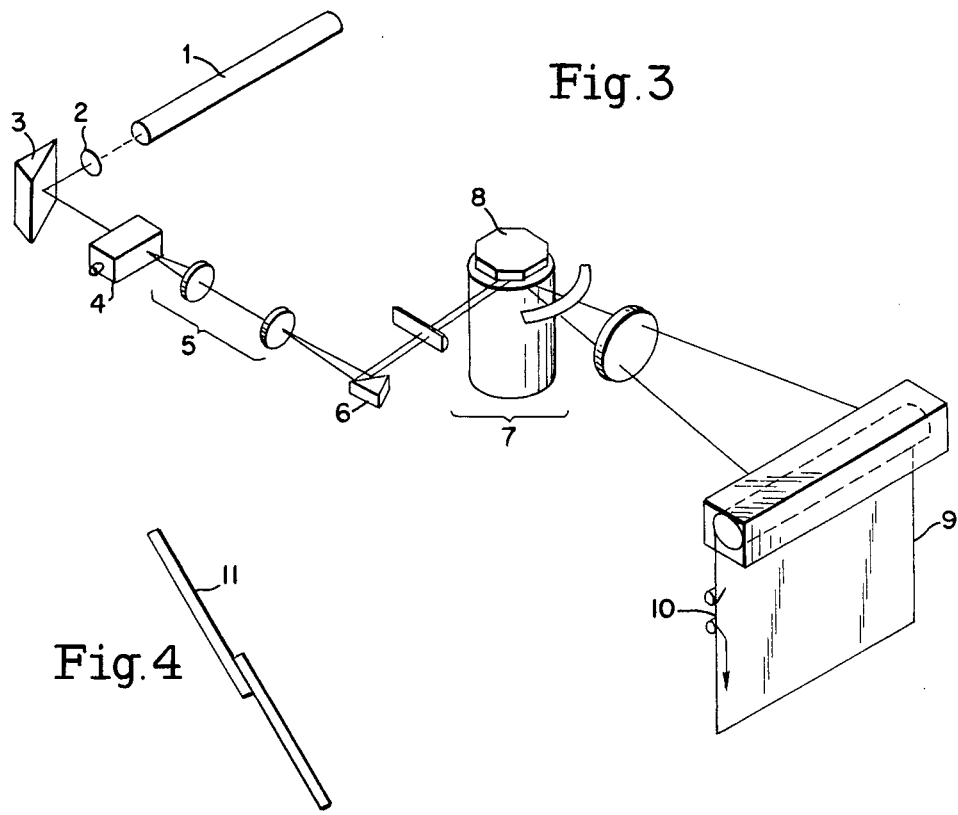
Fig.3
Fig.4
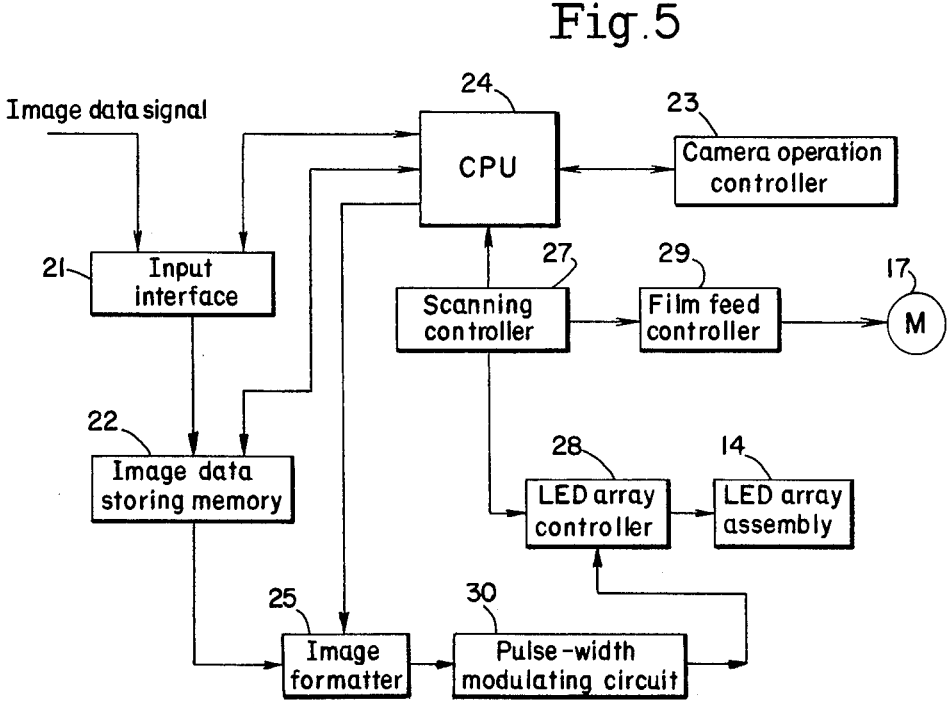
Fig.5

APPARATUS FOR RECORDING CT IMAGES DIRECTLY ON A RECORDING MEDIUM WITHOUT USING A CRT

TECHNICAL FIELD

The present invention relates to a medical image recording apparatus for recording images output from various kinds of diagnostic system such as an X-ray CT. More particularly, the present invention pertains to a medical image recording apparatus which effects recording directly on a recording medium without using a CRT and in which the optical path length of the optical system is extremely short and the number of mechanical operating mechanisms is reduced.

BACKGROUND ART

It is conventional practice to display an image obtained by an X-ray CT or the like on the screen of a CRT and record the displayed image by means of a multiframe photographic recording apparatus. This method involves problems in terms of, for example, resolving power, image distortion and fluorescent noise, since the CRT is employed as a medium. For this reason, medical image recording apparatuses which are arranged to record an image directly on a silver halide film by means of a laser beam scanning system have appeared. Unlike the conventional type of apparatus in which the image displayed on a CRT is recorded on a film (referring to silver halide photosensitive materials including photographic paper in this specification), this new type of apparatus is designed to record an image directly on a film by means of a laser beam which has been subjected to analog modulation.

FIG. 3 shows one example of the basic arrangement of this type of medical image recording apparatus. The reference numeral 1 denotes a He-Ne laser, 2 a lens, and 3 a prism. Light which is emitted from the laser 1 is passed through the lens 2 and bent 90° by the prism 3 before entering an acoustooptic modulator 4, where the laser light is modulated by an ultrasonic wave modulated by information concerning the light and shade of an image so as to form light which carries information concerning the light and shade of the image. This light is then passed through a beam expander 5 and a prism 6 to enter a polygon mirror scanner 8 after the toppling angle has been corrected by a toppling angle correcting optical system 7. The polygon mirror scanner 8 is arranged such that a mirror is rotated and incident light is reflected by the rotating mirror so as to scan a recording film 9 laterally in order to record an image on the film 9. On the other hand, longitudinal scanning is effected by feeding the film 9 through a film feed mechanism 10.

The above-described medical image recording apparatus has advantages such as excellent resolving power, less image distortion and no fluorescent noise since it does not employ a CRT as a medium.

This medical image recording apparatus suffers, however, from the following problems. As will be clear from FIG. 3, the apparatus uses mechanical scanning mechanisms for main and subsidiary scanning operations, that is, the mechanism for rotating the polygon mirror scanner 8 for effecting abscissa scanning as main scanning and the recording film feed mechanism for effecting subsidiary scanning. Therefore, the number of movable portions is relatively large, which is disadvantageous in terms of reliability and transport durability. Further, the optical path length from the laser light source to the film is considerably long, so that it is difficult to arrange the apparatus so as to have a compact structure even though the mirrors are used to bend the beam in order to prevent the optical path from elongating in one direction.

DISCLOSURE OF THE INVENTION

It is an object of the present invention to realize a compact medical image recording apparatus by reducing the number of movable portions and shortening the optical path length.

In the medical image recording apparatus according to the present invention, an LED array assembly (14) having a plurality of one-dimensionally arranged LED's is electronically scanned with an LED array controller (28), and a photosensitive recording medium (15) is fed in a direction perpendicular to the direction of arrangement of the LED's by means of a motor (17) which is controlled by a film feed controller (29). The LED array controller and the film feed controller are operated on the basis of commands given from a scanning controller (27) which is controlled by a CPU. The quantity of light emitted from each individual LED in the LED array assembly is controlled in accordance with a signal given to the LED array controller, the signal being formed in such a manner that image data which is stored in an image data storing memory (22) through an input interface (21) is formatted by means of an image formatter (25) and then converted into an analog signal by means of a D/A converter (26) or a pulse-width modulation circuit (30).

BRIEF DESCRIPTION OF THE DRAWINGS

FIG. 3 is a schematic view of a conventional medical image recording apparatus;

FIG. 4 shows one example in which two LED arrays are employed; and

FIG. 5 is a block diagram of a control system in accordance with another embodiment of the present invention.

BEST MODE FOR CARRYING OUT THE INVENTION

Embodiments of the present invention will be described hereinunder in detail with reference to the drawings.

Figure 1:
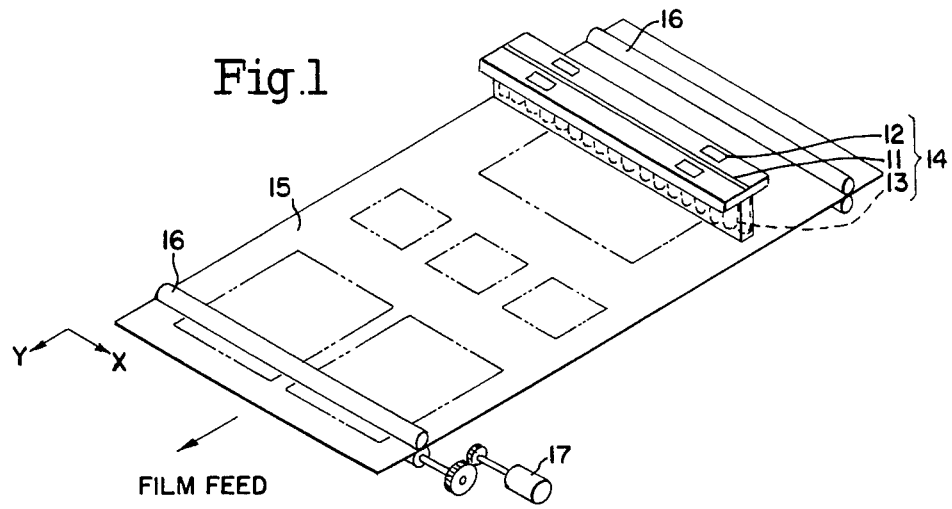
FIG. 1 is a schematic view of a recording mechanism portion of a medical image recording apparatus in accordance with one embodiment of the present invention.
Figure 2:
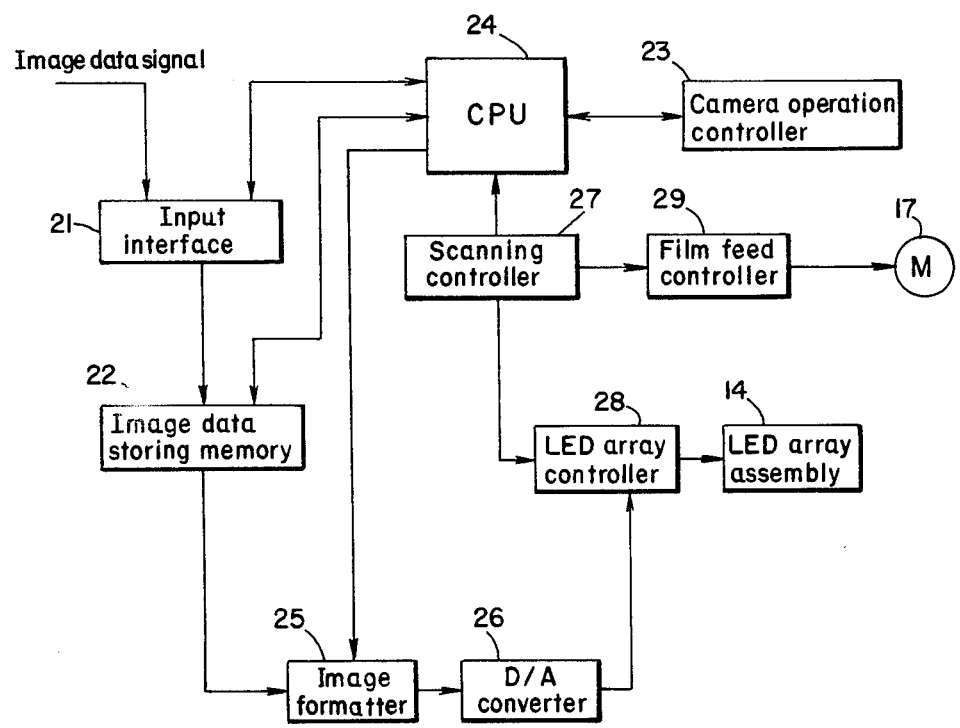
FIG. 2 is a block diagram of a control system employed in the medical image recording apparatus according to the present invention.

FIG. 1 is a schematic view of a recording mechanism portion of a medical image recording apparatus in accordance with one embodiment of the present invention, and FIG. 2 is a block diagram of a control system employed in the medical image recording apparatus according to the embodiment of the present invention. The operation of the control system will first be explained with reference to FIG. 2. Image data which is an input signal to the medical image recording apparatus is stored in an image data storing memory 22 through an input interface 21. Fetching of the image data into the input interface 21 is controlled by a CPU 24 in accordance with a command which is given from a camera operation controller 23. The image data stored in the image data storing memory 22 is delivered to a D/A converter 26 in accordance with a sequence constructed by a image formatter 25 in accordance with a recording format (frame layout) command which is given from the CPU 24 on the basis of a command issued from the camera operation controller 23, and the image data is then converted into an analog signal in the converter 26. At the same time, the recording format command from the CPU 24 is also given to a scanning controller 27 so as to give command signals to an LED array controller 28 and a film feed controller 29, ths controlling a motor 17 and an LED array assembly 14 so that scanning in x- and y-directions is carried out. On the other hand, the analog data signal from the D/A converter 26 is supplied to the LED array controller 28 in order to control the LED array assembly 14. In this case, both of them are operated on the basis of the recording format command issued from the CPU 24 and therefore of course, synchronized with each other.

FIG. 5 shows another example of this circuit. In FIG. 5, the reference numeral 30 denotes a pulse-width modulation circuit which converts image data into a pulse-width modulation signal and supplies this signal to the LED array controller 28. The other members or portions of this arrangement are similar to those shown in FIG. 2.

Referring next to FIG. 1, the LED array assembly 14 comprises an LED array 11, an LED driving IC 12 and a rod lens array 13. The LED array 11 performs exposure by means of light emitted from LED elements arranged at a high density (e.g., 16 dots/mm) in such a way that an image is formed on a film 15 through the rod lens array 13. In this case, the film 15 and the rod lens array 13 are not in contact with each other although they are in close proximity with each other. The scanning in the x-direction is effected in accordance with a command from the LED array controller 28 on the basis of a command issued from the scanning controller 27, and the emission of light from the elements of the LED array 11 is effected by the operation of the LED driving IC 12 on the basis of a command from the LED array controller 28 which is, in turn, based on data supplied from the D/A converter 26. The time required for scanning in the x-direction can be shortened by simultaneously turning on a plurality of LED elements. The quantity of light emitted from each LED element is controlled in an analog manner by means, for example, of direct modulation or pulse-width modulation of the driving current. The LED arra controller 28 modulates the quantity of light emitted from each LED element on the basis of an analog data signal and also performs control of switching with respect to the LED elements and compensation for luminance differences between the elements due to variations in characteristics.

Scanning in the y-direction, that is, the feed of the film, is effected by rotating a film feed roller 16 in accordance with the command given to the motor 17 from the film feed controller 29. It should be noted that the film feed controller 29 also performs unloading of a film from a supply magazine (not shown) and setting of the film, or loading of a recorded film ino a receive magazine (not shown).

As will be clear from the above-described structure and operation, in the medical image recording apparatus according to the present invention, the optical path of the exposure mechanism is extremely short, and the scanning in the x-direction is effected electrically although the scanning in the y-direction is mechanically carried out. Thus, only one mechanical means is used and the number of movable portions is reduced.

It should be noted that the above-described elements are merely examples. For example, although the input interface in the above description is a digital element, a video interface may be provided with respect to the input of an analog video signal and the signal may be digitalized by means of an A/D converter and stored in the image data storing memory. Although in the above-described embodiments the scanning in the y-direction is effected by feeding the film, the LED array may be moved to effect scanning in the y-direction. Further, although in the above-described embodiments the LED array is a single array which extends over the width of a film, two arrays may be arranged in two rows as shown in FIG. 4 in order to reduce the length of a row of LED elements for one array. In such a case, the LED arrays are, of course, controlled such that, at the central overlapping portion, either one of the arrays alone is turned on.

As has been described above in detail, it is possible, according to the present invention, to obtain a medical image recording apparatus in which the optical path length is extremely short and the number of movable portions is reduced and which is therefore improved in reliability and maintainability.

Although the present invention has been described above by way of the best mode for carrying out it, it will be easy for those who have ordinary knowledge of the technical field to which the present invention belongs to make various modifications without departing from the scope of the following claims.

We claim:

1. A CT medical image recording apparatus comprising
   a central processing unit;
   a camera operation controller;
   an LED array assembly having an LED array defined by a plurality of LEDs arranged in a line defined in an X direction;
   an LED array array controller for controlling the emission of light from each of said LEDs constituting said LED array in said LED array assembly;
   mechanical feed means for moving a flat planar photosensitive recording medium in a Y direction substantially perpendicular to said X direction of said LED array, said recording medium being selectively irradiated with light from selected ones of said plurality of LEDs of said LED array;
   a feed controller connected to said mechanical feed means for controlling said mechanical feed means;
   a scanning controller connected to said central processing unit, said feed controller and said LED array controller and responsive to signals from said central processing unit based on command from said camera operation controller for concurrently controlling both said LED array controller to provide selective electronic X direction scanning of said recording medium by said LED array and said feed controller to provide mechanical Y direction scanning of said recording medium by said mechanical feed means;
   an interface connected to said central processing unit for accepting input image data;
   image data storing means connected to said interface and to said central processing unit for effecting formatting using a recording format provided by said central processing unit based on a command from said camera operation controller, said format being used for image recording with respect to image data read out from said image data storing means; and emitted light quantity modulating means connected to said image data storage means and to said LED array controller for supplying to said LED array controller a signal which modulates the quantity of light emitted from each of said LEDs constituting said LED array on the basis of said image data which is formatted by said image formatter.

2. A medical image recording apparatus according to claim 1, wherein said mechanical feed means comprises means for moving said photosensitive recording medium.

3. A medical image recording apparatus according to claim 1, wherein said mechanical feed means comprises means for moving said LED array assembly.

4. A medical image recording apparatus according to claim 1, wherein said interface for input image data is an interface for a digital signal.

5. A medical image recording apparatus according to claim 1, wherein said interface for input image data is an interface for an analog signal.

6. A medical image recording apparatus according to claim 1, wherein said emitted light quantity modulating means includes a D/A converter.

7. A medical image recording apparatus according to claim 1, wherein said emitted light quantity modulating means includes a pulse-width modulation circuit.

* * * * *